United States Patent [19]

Rabinovich

[11] Patent Number: 6,125,394
[45] Date of Patent: Sep. 26, 2000

[54] COMPUTER SYSTEM HAVING A PLURALITY OF RESOURCES AND UTILIZING A SELECTION MECHANISM TO SELECT THE RESOURCES BASED UPON HISTORICAL LOADING

[75] Inventor: Michael Rabinovich, Gillette, N.J.

[73] Assignee: AT&T Corporation, New York, N.Y.

[21] Appl. No.: 08/869,530

[22] Filed: Jun. 6, 1997

[51] Int. Cl.[7] .............................. G06F 13/00; G06F 13/42; G06F 15/163
[52] U.S. Cl. ........................... 709/226; 709/100; 709/104; 709/105; 709/220; 709/225; 709/229; 395/183.14; 395/704; 711/133; 711/134
[58] Field of Search ..................... 395/672, 673, 395/675, 676, 704, 183.14; 711/133, 134; 709/100, 105, 104, 220, 226, 225, 229

[56] References Cited

U.S. PATENT DOCUMENTS

| | | | |
|---|---|---|---|
| 5,301,323 | 4/1994 | Maeurer et al. | 395/650 |
| 5,603,029 | 2/1997 | Aman et al. | 395/675 |
| 5,692,193 | 11/1997 | Jagannathan et al. | 709/106 |
| 5,745,703 | 4/1998 | Cejtin et al. | 709/238 |
| 5,745,778 | 4/1998 | Alfieri | 395/800.01 |

OTHER PUBLICATIONS

Keith Lopez, MACH 3 Kernel Principles, Open Software Foundation and Carngie Mellon University, Jul. 15, 1992.
David L. Black, The Mach cpuserver: An Implementation of Processor Allocation, Aug. 14, 1990.

*Primary Examiner*—Mark H. Rinehart
*Assistant Examiner*—William C. Vaughn, Jr.
*Attorney, Agent, or Firm*—Kenyon & Kenyon

[57] ABSTRACT

A computer system in which resources are selected or purged based on extremes of utilization (i.e., by virtue of having either the highest or lowest utilization ranking in a group of resources) effectively handles newly added resources whose initial utilization rankings do not reflect their true popularity (or lack thereof). New resources are arbitrarily assigned an initial utilization ranking that is in the middle of the range of utilization rankings—e.g., preferably the median or, more preferably, the mean—of other members of the group. Therefore, the new resource is not immediately either selected or purged, because its initial utilization ranking is not at either extreme, and eventually, after not too long an interval, the utilization ranking reflects the true conditions, and the resource will be selected or purged, or not, as the statistics may warrant. In the meantime, other resources in the group are selected or purged based on their actual statistics which reflect the true conditions closely enough.

41 Claims, 2 Drawing Sheets

COMPUTER SYSTEM HAVING A PLURALITY OF RESOURCES AND UTILIZING A SELECTION MECHANISM TO SELECT THE RESOURCES BASED UPON HISTORICAL LOADING

BACKGROUND OF THE INVENTION

This invention relates to computer systems having a plurality of resources which are utilized to varying degrees. More particularly, this invention relates to such a computer system in which the selection of resources depends on historical loading, and which provides a mechanism for handling a resource that has no history, either because the resource is new or because maintaining the history for all resources is too difficult or expensive.

Computer systems or networks typically have multiple resources (processors, data objects, memory devices, communications gateways, output devices, etc.). In many cases, the system must select a resource from a group of resources of a particular type. For example, a central processing unit ("CPU") in a multiprocessor system must be chosen to perform a task, a storage server in a computer network must be chosen to host a data object, a data item must be chosen to be evicted from a cache memory, etc. The goal in such cases is to make a selection that will result in the fastest or most efficient operation of the system or network. Frequently, such selections are made based on utilization statistics. Thus, for whatever type of resource is required, utilization statistics are examined and, most commonly, that resource of the required type, that in the recent past has had a utilization metric (e.g., rate or count) that is, depending on the nature of the task, either the lowest or highest utilization metric of all resources of that type, is selected. However, such a selection technique can lead to anomalous or unintended results in certain situations, particularly when a new resource, for which no usage statistics are available, is added to the group of resources.

For example, in the case of a computer system having multiple processors, the known selection technique for assignment of tasks to processors would result in the selection of the processor that is least busy. However, if a new processor is added to the system (or an existing processor that was offline returns to active status), that processor will, by definition, have the lowest utilization metric of any processor in the system. Therefore, for a time, all new tasks will be assigned to that processor. Because there is a lag in updating the utilization statistics, the new processor will, at least temporarily, be swamped. Ultimately, the statistics will reflect the high utilization, tasks will no longer be assigned to that processor, and the system will stabilize. In the meantime, however, system performance may be degraded.

As another example, in a computer system having a large number of processors and a large number of other resources, it may be desirable to locate each particular other resource at the same location as the processor that most frequently uses it (i.e., to "co-locate" the other resource with the processor), to reduce communication traffic and delay in the system. To determine which of the various processors that requests a particular other resource is the one that requests that resource most frequently, it may be impractical, particularly in a very large system, to keep statistics on every processor's utilization of every other resource. Therefore, instead, it is known to keep statistics on a group of processors that are the "best candidates" for co-location of a particular other resource thereat. When a new processor requests the other resource, it is a potential candidate and so is added to the group, replacing the candidate with the lowest number of "hits." However, the new processor is now the candidate with the lowest number of hits. Therefore, if a second new processor requests the same other resource, it will replace the first new processor in the list of candidates for co-location. One can envision a situation where two new processors become the most frequent users of a particular resource, but never get established on the list candidates for co-location because each continually replaces the other on the list.

In another example, a computer system may have a cache capable of holding a certain number of data objects that is less than the total number of data objects that may need to be cached. The goal would be to cache those objects most frequently used. The first time some new object is used, it is not known whether it will become frequently used or not. Therefore, it is typically inserted into the cache, and its utilization is monitored. However, the utilization metric is "1" (i.e., one use) the first time the object is placed in the cache, which by definition is the lowest utilization metric for any object in the cache (except perhaps for other objects with the same utilization metric). If a second new object arrives, it will be inserted in the cache and, if the cache is full, the object with the lowest utilization metric will be evicted from the cache. Normally, that would be the previous "new" object. Even if the previous new object is extremely popular, it may never get a chance to be established in the cache, or it may not get established until much later than it should, because it will be caught in a cycle of being inserted in the cache and then evicted in favor of other new objects.

It is clear, then, that selection mechanisms that rely on historical utilization data may not handle well the situation where a new resource, for which there are no historical data, is added.

It would be desirable to be able to provide a computer system or network in which selection of resources depends on historical loading, but which provides a mechanism for handling a resource that has no history, either because it is new or because its history has not been maintained.

SUMMARY OF THE INVENTION

It is an object of this invention to provide a computer system or network in which selection of resources depends on historical loading, but which provides a mechanism for handling a resource that has no history, either because it is new or because its history has not been maintained.

In accordance with the present invention, there is provided a computer system having a plurality of resources of different types. At least some of the resources are grouped in a group of resources from which a resource is selected. The resources are connected for communication one with another and utilization one by another. When a particular type of resource is required to be selected, a selection unit selects among the resources of that particular type. The selection unit includes a statistical unit for maintaining utilization rankings for the resources based on historical data regarding utilization of the resources. For a particular subset of the resources comprising a plurality of members of the particular type, one of the members has a minimum utilization ranking and another of the members has a maximum utilization ranking. The statistical unit identifies that one of the members having either the minimum utilization ranking, or the maximum utilization ranking, as may be appropriate. A new resource initialization unit assigns, to a resource that is newly added to the group and is of one of the types, an initial utilization ranking that is between the minimum utilization ranking for that one of the types and the maximum utilization ranking for that one of the types.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
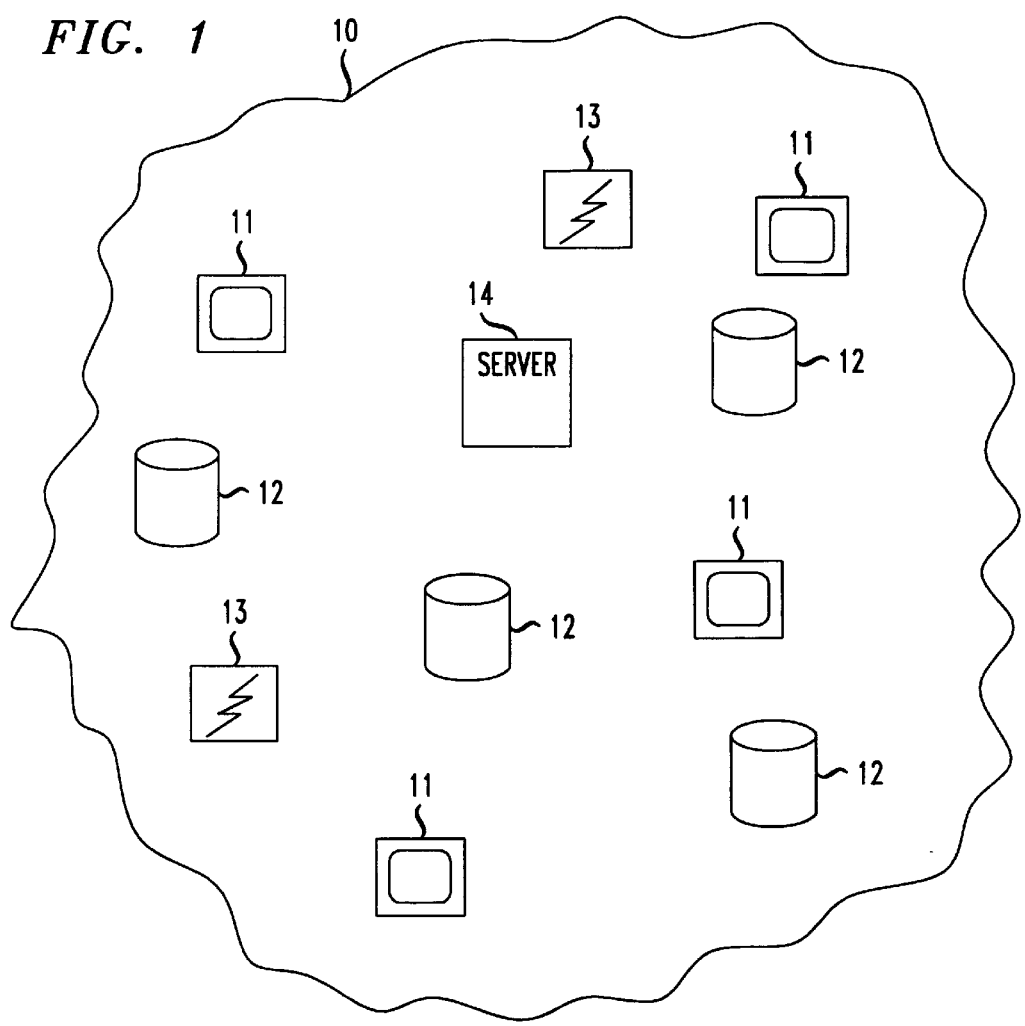
FIG. 1 is a schematic diagram of a preferred embodiment of a computer system according to the present invention.

The present invention alleviates some of the difficulties described above in systems in which resources are selected based on historical utilization rates, and particularly the difficulties in such systems, where the resource with the lowest or highest utilization metric is selected to perform a task or to be evicted from whatever group of resources is being considered, that arise when a new resource is added to the group. The solution of the present invention is to assign to the new resource an arbitrary initial utilization metric that does not accurately reflect the past utilization of the resource, either because the resource is brand new and has never been used (or has been used only once), or because no past utilization data are available.

It should be noted that while the utilization statistics have been referred to as utilization "rates," the utilization rate frequently, and even preferably, may be as simple as a count of the number of times the resource has been used (or has used another resource), possibly limited to a particular time period. Such a count would preferably be incremented each time the resource was used (or used another resource).

The arbitrary initial utilization metric assigned in accordance with the invention preferably places the resource approximately in the middle of the group under consideration from a utilization standpoint. Preferably, the initial utilization metric assigned to the new resource is either the median or the mean of the utilization metrics of the other members of the group. Assigning an initial utilization metric substantially equal to the mean utilization metric for the group is particularly preferred because as each individual utilization metric is updated, it is relatively easy to modify the mean incrementally in constant time, by adding to the previous mean value the quotient of (a) the change in the utilization metric of the group member whose utilization metric has changed, and (b) the number of members of the group. Determining the median, while not difficult, could not be done incrementally and would require more computation.

By assigning to the new resource an initial arbitrary utilization metric that is neither the lowest in the group nor the highest in the group, one assures that the new resource initially will not be selected by a selection process that requires either a minimum utilization metric (such as those described above), or a maximum utilization metric (such as a process for moving data resources to processors that most frequently use them).

Although initially, in an application where the group member with the minimum utilization is sought to perform a task, group members with higher utilization metrics will be chosen when the new resource actually has the minimum utilization metric, eventually, as the other members of the group are selected and the new resource is not, their utilization metrics will rise while that of the new resource remains constant, until it becomes the minimum and is selected. However, no one resource will retain the minimum utilization metric long enough to be overwhelmed, as would be the case where the new resource is assigned its actual utilization metric as its initial metric.

Similarly, in an application where the group member with the maximum utilization is sought, although the new resource may prove extremely popular, it will take some time before the arbitrary initial utilization metric increases to reflect the actual utilization of the resource. During that time other resources with apparently higher utilization metrics will be selected, but eventually the utilization metric of the new resource will become the highest and it will be selected. More importantly, the new resource will not be eliminated from the group, and therefore from consideration altogether, before it is given the opportunity for its low initial utilization metric to be replaced by a higher utilization metric that reflects its popularity and keeps it in the competition against other resources.

The invention will now be described with reference to FIGS. 1–3.

Figure 2:
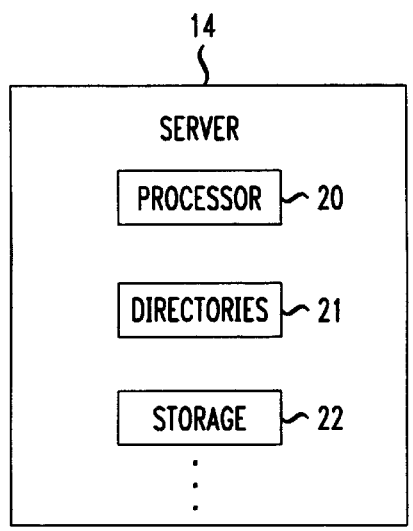
FIG. 2 is a schematic diagram of a preferred embodiment of a server in the computer system of FIG. 1.

A computer system of the type with which the present invention can be used is shown in FIG. 1. As shown in this example, computer system 10 is a local- or wide-area network, although it could also be a parallel, or massively-parallel, processing system (not shown). System 10 has a plurality of stations 11, and a plurality of resources including disk drives and other storage systems 12, modems and other communications facilities 13, as well as other types of resources (not shown). Substantially all of the resources are generally available to each of stations 11. Operations of system 10 are under the supervision of one or more servers 14. As seen in FIG. 2, server 14 preferably has a processor 20 and directories 21 identifying the locations of various resources and their association with particular stations 11 or with other resources. Server 14 preferably has its own storage 22 which may be internal to server 14 or in an external unit 12.

As discussed above, one or more of storage units 12 may hold cache memory for various processes. When a data item not currently in the cache is requested, it is added to the cache. Of the items already in the cache, the item whose metric (e.g., rate or count) has the minimum value is evicted from the cache. In accordance with the present invention, the metric for the new member is preferably assigned to be the average of the metric of the pre-existing members of the population, to prevent it from automatically being evicted the first time room is required in the cache, before it has an opportunity to establish its popularity.

Similarly as described above, various data objects can be placed on any of the storage units 12 which are shown in physical proximity with particular ones of stations 11. Physical location of resources 12 relative to the stations 11 that use them may have significance if system 10 is large enough, because then the added traffic on system 10 involved in routing data to and from resources 12, and the associated time delays, may prove unacceptable. It may therefore be desirable to locate a particular data object on a storage unit 12 near one of stations 11 that uses it frequently. When the number of candidate stations 11 for "co-location" of the particular data object is high, it is impractical to maintain the utilization statistics for each candidate and each data object. Instead, the statistics can be kept on a small group of likely candidates for each data object.

When a new candidate, not currently in the group, requests the data object, it is added to the group, replacing an existing member with the lowest metric (e.g., rate or count) for utilization of the data object. To prevent that existing member from being the newest candidate, which has not yet had a chance to show its true level of usage of the data object, the metric for the new candidate is preferably assigned to be the average of the metric of the pre-existing members of the candidate population. When the time comes to select a member of the candidate group with which to co-locate the data object, the member of the candidate group with the highest utilization metric for this object is selected. The member that is selected will have survived to achieve the highest utilization metric, without being evicted from the candidate group, because at the time it was added to the group it was assigned an arbitrary utilization metric in accordance with the invention. At the same time, while other, newer members of the candidate group are assigned arbitrary initial utilization metrics higher than their actual utilization, those arbitrary initial utilization metrics are not so high as to cause those other, newer candidates to be inappropriately selected for co-location.

Similarly, if system 10 is a parallel processing system, and server 14 needs to assign a task to one of stations 11, it preferably would assign the task to the station 11 with the lowest utilization metric (e.g., rate or count). Again, to prevent the most recently added station 11 from being assigned the most work, to the point that its performance, and that of the whole system 10, degrades, its initial utilization metric preferably is set to the average of the utilization metrics of the other stations 11.

Figure 3:
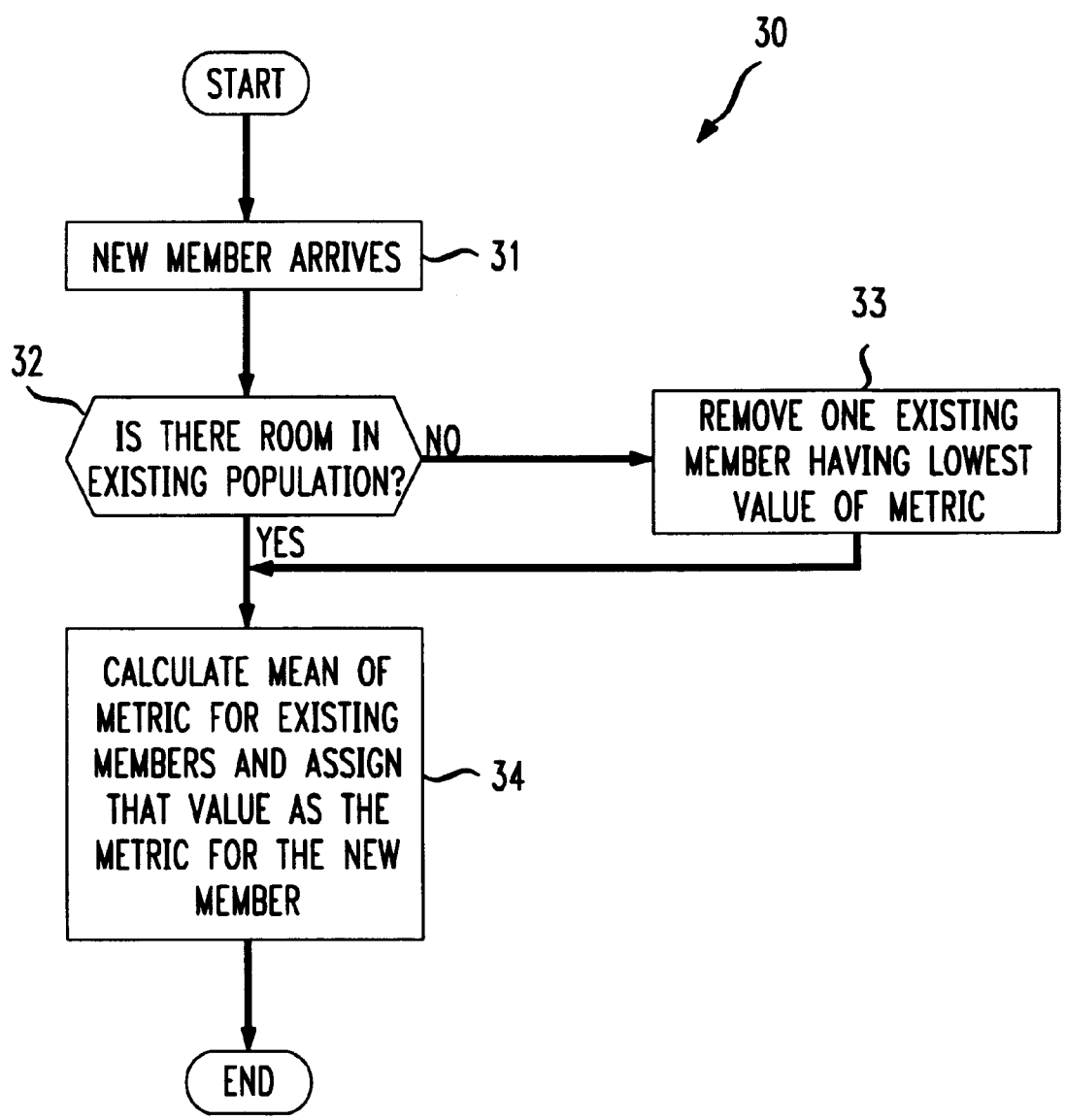
FIG. 3 is a flow diagram showing a preferred embodiment of the method of operation of the computer system of FIGS. 1 and 2.

FIG. 3 is a flow diagram of a portion of the system operating software for assigning the metric to the new member of the population, the remainder of the selection process being conventional. Process 30 starts at 31 where the new member arrives. The process proceeds to test 32 to determine whether there is room in the population for the new member, or if there is not room and eviction of one of the older members is required. If there is no room, then the process proceeds to step 33 where the member whose metric for the particular characteristic being measured is lowest is evicted to make room for the new member. After step 33, or if at test 32 there is room for a new member without eviction of an old member, the process proceeds to step 34 where the mean metric for the preexisting members of the population is calculated, and assigned arbitrarily to the new member as its value for the metric, and the process ends.

Although in the process as described, the mean is used, the median could also be used. However, in order to update the median whenever the metric for one member changes (e.g., when the member is accessed by another component of the system), a new calculation of the median would be required. On the other hand, as stated above, if the mean is used, it can be updated incrementally as any member is accessed by the system, simply by adding to the old mean quotient of (1) the change in the value of the metric for the accessed member, and (2) the number of members in the population being examined.

Thus it is seen that a computer system or network in which selection of resources depends on historical loading, but which provides a mechanism for handling a resource that has no history, either because it is new or because its history has not been maintained, has been provided. One skilled in the art will appreciate that the present invention can be practice by other than the described embodiments, which are presented for purposes of illustration and not of limitation, and the present invention is limited only by the claims which follow.

What is claimed is:

1. A computer system comprising;
   a plurality of resources of different types, at least two of the plurality of resources being in a group of resources of a particular type from which a resource is selected, each resource of the plurality being connected for communication with and utilization by at least one resource of the plurality; and
   a selection unit for,
      i) when a resource from the group having resources of a particular type is required to be selected, selecting from among said resources of the group based on historical data regarding utilization of said resources of the group, and
      ii) determining whether a resource of the group should be eliminated from the group when a new resource is added to the group, and if so, determining which resource of the group should be eliminated from the group when the new resource is added to the group,
   said selection unit comprising:
      a statistical unit for maintaining utilization rankings for said resources of the group based on historical data regarding utilization of said resources of the group, wherein, for a particular subset of said resources of the group comprising a plurality of members of said particular type, one of said members has a minimum utilization ranking and another of said members has a maximum utilization ranking, said statistical unit identifying said one of said members having one of (a) said minimum utilization ranking, and (b) said maximum utilization ranking, and
      a new resource initialization unit for assigning to a resource that is newly added to said group, said newly added resource being of said particular type and not initially in said group, an initial utilization ranking between said minimum utilization ranking for said one of said particular type and said maximum utilization ranking for said one of said particular type.

2. The computer system of claim 1 wherein, when a particular resource of one of said types is utilized, said statistical unit updates at least said utilization ranking for said particular resource of said one of said types.

3. The computer system of claim 1 wherein said new resource initialization unit assigns to said newly available resource an initial utilization ranking that is a mean of said utilization rankings for said one of said types.

4. The computer system of claim 1 wherein said new resource initialization unit assigns to said newly available resource an initial utilization ranking that is a median of said utilization rankings for said one of said types.

5. The computer system of claim 1 wherein said one of said types is cached data objects.

6. The computer system of claim 1 wherein said one of said types is processors.

7. A computer system comprising:
   a plurality of processors, each of said processors capable of performing tasks to be carried out by said computer system; and
   a selection unit for,
      i) when a particular task is to be carried out, selecting a processor from among a group of at least some of said processors based on historical data regarding utilization of said processors of the group, and ii) determining whether a processor of the group should be eliminated from the group when a new processor is added to the group, and if so, determining which processor of the group should be eliminated from the group when the new resource is added to the group, said selection unit comprising:

a statistical unit for maintaining utilization rankings for said processors in said group based on historical data regarding utilization of said processors in said group, one of said processors in said group having a minimum utilization ranking and another of said processors having a maximum utilization ranking, said statistical unit identifying said one of said processors in said group having said minimum utilization ranking, and a new processor initialization unit for assigning to a processor that is newly added to said group, said newly added processor not initially in said group, an initial utilization ranking between said minimum utilization ranking and said maximum utilization ranking.

8. The computer system of claim 7 wherein, when said selection unit selects one of said processors, said statistical unit updates at least said utilization ranking for said one of said processors.

9. The computer system of claim 7 wherein said new processor initialization unit assigns to said newly available processor an initial utilization ranking that is a mean of said utilization rankings for other said processors.

10. The computer system of claim 7 wherein said new processor initialization unit assigns to said newly available processor an initial utilization ranking that is a median of said utilization rankings for other said processors.

11. A computer system comprising:

at least one processor, and a plurality of stored data objects and a plurality of cached data objects available to each of said at least one processor; and a selection unit for, when a stored data object is retrieved by one of said at least one processor and is to become one of said cached data objects, selecting which other one of said cached data objects should be purged from said cached data objects based on historical data regarding utilization of said cached data objects, said selection unit comprising:

a statistical unit for maintaining utilization rankings for said cached data objects based on historical data regarding utilization of said cached data objects by said at least one processor, one of said cached data objects having a minimum utilization ranking and another of said cached data objects having a maximum utilization ranking, said statistical unit identifying said one of said cached data objects having said minimum utilization ranking, and a new object initialization unit for assigning to a newly cached data object, said newly cached data object not initially one of said cached data objects, an initial utilization ranking between said minimum utilization ranking and said maximum utilization ranking.

12. The computer system of claim 11 wherein, when one of said at least one processor accesses one of said cached data objects, said statistical unit updates at least said utilization ranking for said one of said cached data objects.

13. The computer system of claim 11 wherein said new object initialization unit assigns to said newly cached data object an initial utilization ranking that is a mean of said utilization rankings for other said cached data objects.

14. The computer system of claim 11 wherein said new processor initialization unit assigns to said newly available processor an initial utilization ranking that is a median of said utilization rankings for other said cached data objects.

15. A computer system comprising:

a plurality of processors, said processors being connected for communication one with another;

a plurality of resources other than processors, each of said resources being located at one of said processors but being available to other said processors; and a selection unit for, when there is a candidate group of said processors at one of which a respective one of said resources should be located based on utilization of said respective one of said resources by respective ones of said processors in said group, determining at least one of (a) which processor in said group should be eliminated from said group when a new candidate processor is added to said group, and (b) at which processor in said group said one of said resources should be located, said selection unit comprising:

a statistical unit for maintaining, for a respective one of said resources, rankings of utilization of said one of said resources by each of said processors in said group based on historical data regarding utilization of said one of said resources by said processors in said group, utilization of said one of said resources by one of said processors in said group having a minimum utilization ranking and utilization of said one of said resources by another of said processors in said group having a maximum utilization ranking, said statistical unit identifying at least one of (a) said one of said processors associated with said minimum utilization ranking for elimination from said group, and (b) said one of said processors associated with said maximum utilization ranking for location thereat of said one of said resources, and a new candidate initialization unit for assigning to utilization of said one of said resources by a processor that is newly added to said group, said newly added processor not initially in said group, an initial utilization ranking between said minimum utilization ranking and said maximum utilization ranking.

16. The computer system of claim 15 wherein, when one of said processors in said group accesses one of said resources, said statistical unit updates at least said utilization ranking for utilization of said one of said resources by said one of said processors in said group.

17. The computer system of claim 15 wherein said new candidate initialization unit assigns to utilization of said one of said resources by said new candidate processor an initial utilization ranking that is a mean of said utilization rankings for utilization of said one of said resources by said processors in said group.

18. The computer system of claim 15 wherein said new candidate initialization unit assigns to said new candidate processor an initial utilization ranking that is a median of said utilization rankings for utilization of said one of said resources by said processors in said group.

19. For use in a computer system having a plurality of resources of different types, at least some of said resources being in a group of resources from which a resource is selected, said resources being connected for communication one with another and utilization one by another, a method for selecting among said resources of a particular type, said method comprising:

when a particular type of resource is required to be selected, selecting among said resources of said particular type based on historical data regarding utilization of said resources, said selecting step comprising:

maintaining utilization rankings for said resources based on historical data regarding utilization of said resources, wherein, for a particular subset of said resources comprising a plurality of members of said particular type, one of said members has a minimum utilization ranking and another of said members has a maximum utilization ranking, and identifying said one of said members having one of (a) said minimum utilization ranking, and (b) said maximum utilization ranking, determining at least one of (i) which resource should be eliminated from said group, when a new resource is added to said group, and (ii) which resource of said particular type should be selected, based on historical data regarding utilization of said resources, and assigning to a resource that is newly added to said group, said newly added resource being of said particular type and not initially in said group, an initial utilization ranking between said minimum utilization ranking for said one of said types and said maximum utilization ranking for said one of said type.

20. The method of claim 19 further comprising, when a particular resource of one of said types is utilized, updating at least said utilization ranking for said particular resource of said one of said types.

21. The method of claim 19 wherein said assigning comprises assigning to said newly available resource an initial utilization ranking that is a mean of said utilization rankings for said one of said types.

22. The method of claim 19 wherein said assigning comprises assigning to said newly available resource an initial utilization ranking that is a median of said utilization rankings for said one of said types.

23. The method of claim 19 wherein said one of said types is cached data objects.

24. The method of claim 19 wherein said one of said types is processors.

25. For use in a computer system having a plurality of processors, each of said processors capable of performing tasks to be carried out by said computer system, a method for, when a particular task is to be carried out, selecting a processor from among a group of at least some of said processors, said method comprising:

maintaining utilization rankings for said processors in said group based on historical data regarding utilization of said processors in said group, one of said processors in said group having a minimum utilization ranking and another of said processors in said group having a maximum utilization ranking, and identifying said one of said processor in said group having said minimum utilization ranking, determining at least one of (i) which processor should be eliminated from said group, when a new resource is added to said group, and (ii) which processor of said group should be selected, based on historical data regarding utilization of said resources, and assigning to a processor that is newly added to said group, said newly added processor not initially in said group, an initial utilization ranking between said minimum utilization ranking and said maximum utilization ranking.

26. The method of claim 25 further comprising, when one of said processors in said group is selected, updating at least said utilization ranking for said one of said processors in said group.

27. The method of claim 25 wherein said assigning comprises assigning to said newly added processor in said group an initial utilization ranking that is a mean of said utilization rankings for other said processors in said group.

28. The method of claim 25 wherein said assigning comprises assigning to said newly added processor in said group an initial utilization ranking that is a median of said utilization rankings for other said processors in said group.

29. For use in a computer system having at least one processor, and a plurality of stored data objects and a plurality of cached data objects available to each of said at least one processor, a method for, when a stored data object is retrieved by one of said at least one processor and is to become one of said cached data objects, selecting which other one of said cached data objects should be purged from said cached data objects, said method comprising:

maintaining utilization rankings for said cached data objects based on historical data regarding utilization of said cached data objects by said at least one processor, one of said cached data objects having a minimum utilization ranking and another of said cached data objects having a maximum utilization ranking; and identifying said one of said cached data objects having said minimum utilization ranking, determining which cached data object should be eliminated from said cached data objects, when a stored data object is newly cached, and assigning to a newly cached data object, said newly cached data object not initially one of said cached data objects, an initial utilization ranking between said minimum utilization ranking and said maximum utilization ranking.

30. The method of claim 29 further comprising, when one of said at least one processor accesses one of said cached data objects, updating at least said utilization ranking for said one of said cached data objects.

31. The method of claim 29 wherein said assigning comprises assigning to said newly cached data object an initial utilization ranking that is a mean of said utilization rankings for other said cached data objects.

32. The method of claim 29 wherein said assigning comprises assigning to said newly available processor an initial utilization ranking that is a median of said utilization rankings for other said cached data objects.

33. For use in a computer system having a plurality of processors, said processors being connected for communication one with another, a plurality of resources other than processors, each of said resources being located at one of said processors but being available to other said processors, a method for, when there is a candidate group of said processors at one of which a respective one of said resources should be located based on utilization of said respective one of said resources by respective ones of said processor in said group, determining at least one of (a) which processor in said group should be eliminated from said group when a new candidate processor enters said group, and (b) at which processor in said group said one of said resources should be located, said method comprising:

maintaining, for a respective one of said resources, rankings of utilization of said one of said resources by said processors in said group based on historical data regarding utilization of said one of said resources by said processors in said group, utilization of said one of said resources by one of said processors in said group having a minimum utilization ranking and utilization of said one of said resources by another of said processors in said group having a maximum utilization ranking, and identifying (a) said one of said processors associated with said minimum utilization ranking for elimination from said group, and (b) said one of said processors associated with said maximum utilization ranking for location thereat of said one of said resources, determining at least one of (i) which processor should be eliminated from said group, when a new processor enters said group, and (ii) at which processor in said group said one of said resources should be located, and assigning to utilization of said one of said resources by a processor that is newly added to said group, said newly added processor not initially in said group, an initial utilization ranking between said minimum utilization ranking and said maximum utilization ranking.

34. The method of claim 33 further comprising, when one of said processors in said group accesses one of said resources, updating at least said utilization ranking for utilization of said one of said resources by said one of said processors in said group.

35. The method of claim 33 wherein said assigning comprises assigning to utilization of said one of said resources by said new candidate processor an initial utilization ranking that is a mean of said utilization rankings for utilization of said one of said resources by said processors in said group.

36. The method of claim 33 wherein said assigning comprises assigning to utilization of said one of said resources by said new candidate processor an initial utilization ranking that is a median of said utilization rankings for utilization of said one of said resources by said processors in said group.

37. For use in a computer system having at least one group of resources of the same type, a method for selecting at least one resource from the at least one group, the method comprising:

maintaining a utilization ranking for each resource in the at least one group, determining at least one of (i) which resource should be eliminated from the at least one group, when a new resource is added to the at least one group, and (ii) which resource of the at least one group should be selected, based on historical data regarding utilization of said resources, and assigning to a resource that is newly added to the at least one group, the newly added resource being of the same type as the resources in the at least one group and not initially in the at least one group, an initial utilization ranking between the minimum utilization ranking for the at least one group and the maximum utilization ranking for the at least one group.

38. The method of claim 37, wherein the resources in the at least one group are of processors type.

39. The method of claim 38, wherein the resources in the at least one group are of cached data objects type.

40. For use in a computer system having at least one processor and at least one group of cached data objects available to the at least one processor, a method for selecting at least one cached data object for elimination from the at least one group, the method comprising;

maintaining a utilization ranking for each cached data object in the at least one group determining which cached data object should be eliminated from the at least one group, when a data object is newly cached and added to the at least one group, and assigning to a data object that is newly cached and added to the at least one group, said newly cached and added data object not initially in the at least one group, an initial utilization ranking between the minimum utilization ranking for the at least one group and the maximum utilization ranking for at least one group.

41. For use in a computer system having at least one group of processors and a plurality of resources other than processors, each resource from the plurality of resources other than processors being located at a processor from the at least one group of processors, a method for selecting at which processor a resource from the plurality of resources other than processors should be located, the method comprising:

maintaining, for one resource from the plurality of resources other than processors, a ranking of the utilization of the resource by each of the processors in the at least one group, determining at least one of (i) which processor should be eliminated from the at least one group, when a new processor is added to the at least one group, and (ii) at which processor in the at least one group the one resource from the plurality of resources other than processors should be located, and assigning to a processor that is newly added to the at least one group, the newly added processor not initially in the at least one group, an initial utilization ranking between the minimum ranking of utilization of the resource by any processor in the at least one group and the maximum ranking of utilization of the resource by any processor in the at least one group.

* * * * *